Sept. 28, 1971  H. N. LAUSCH ET AL  3,608,286
MOWER-CONDITIONER FRAME

Filed Aug. 17, 1970  4 Sheets-Sheet 1

INVENTORS
BRUCE D. SCHWALM
HENRY N. LAUSCH
BY
John C. Thompson
ATTORNEY

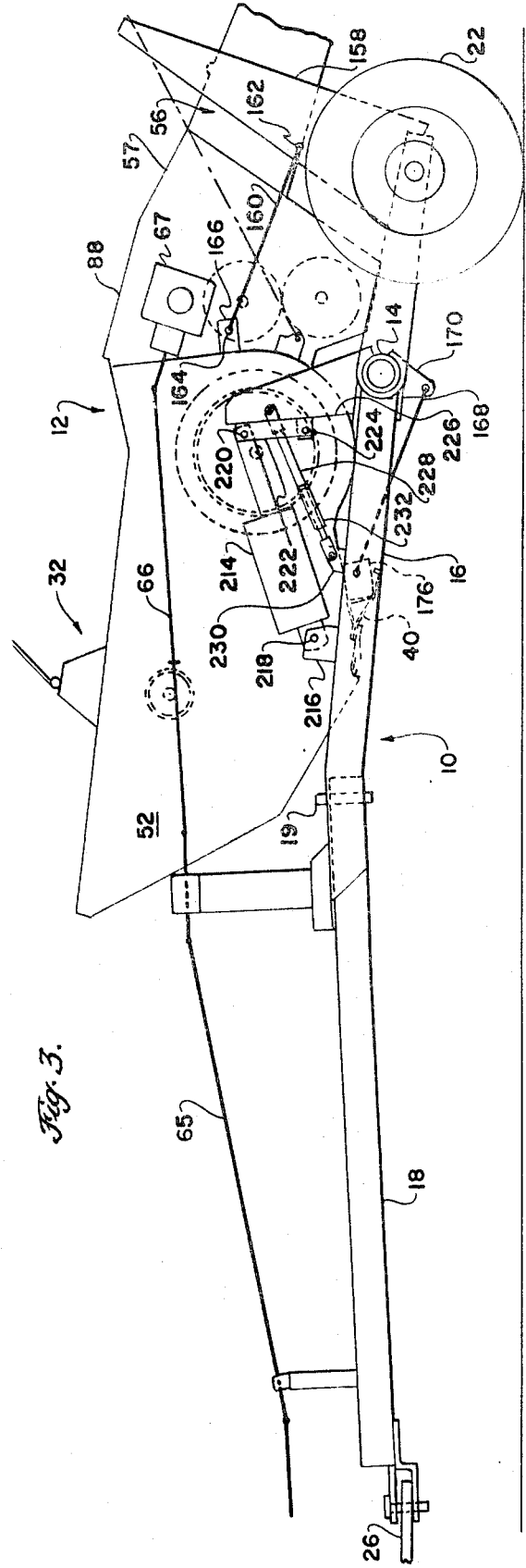
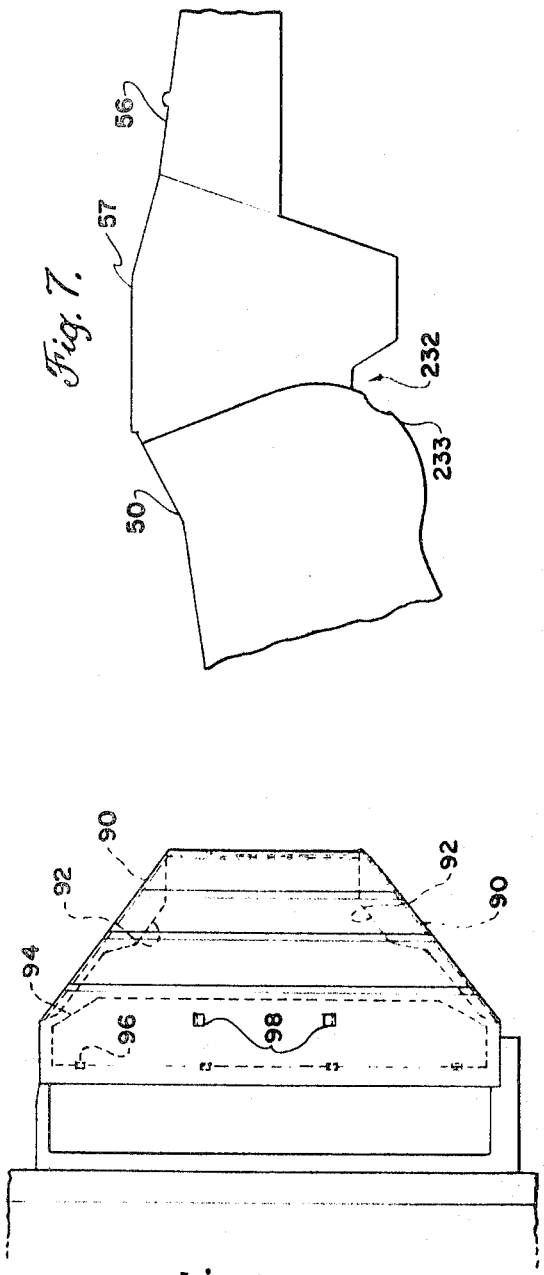

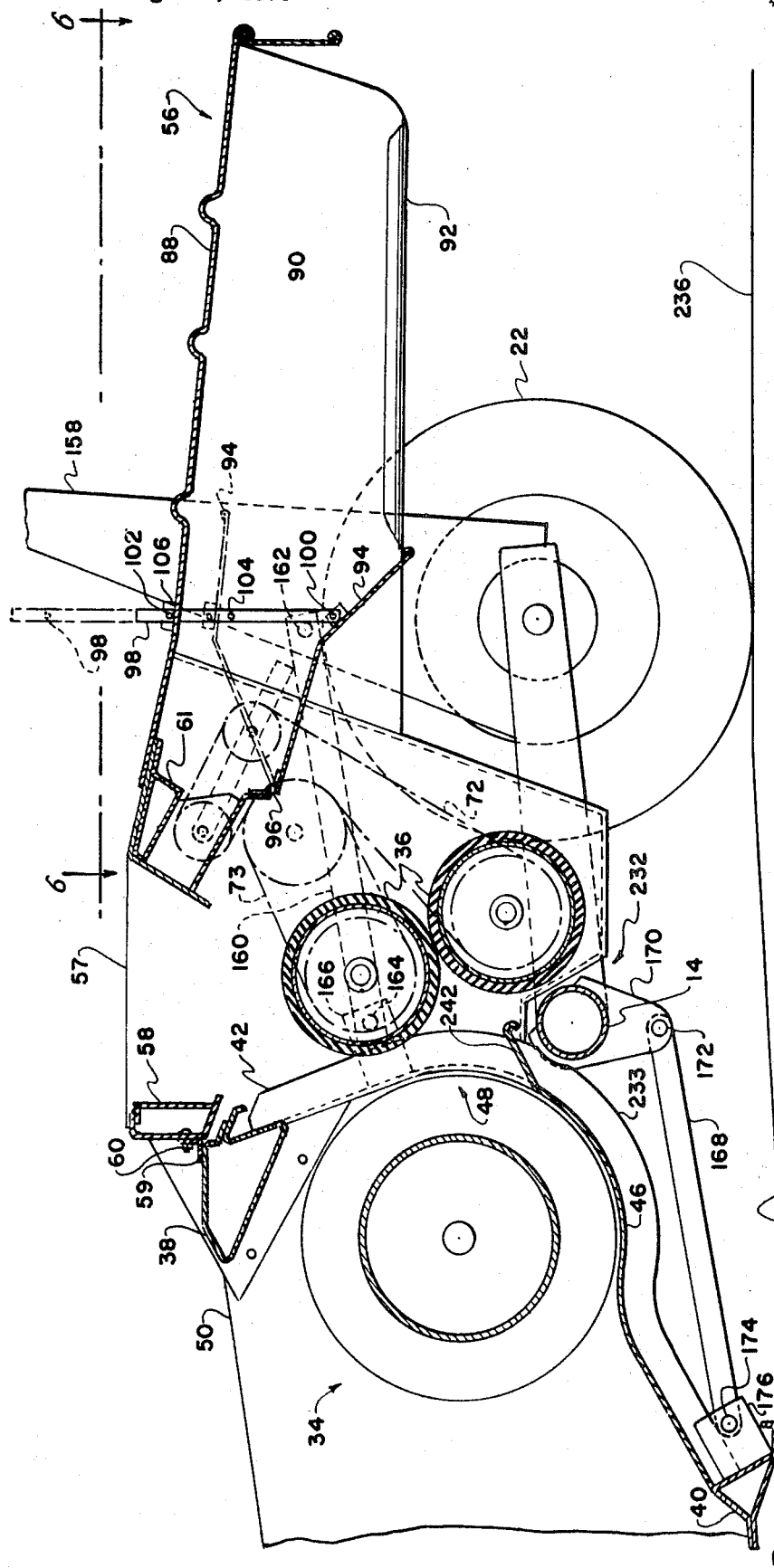

United States Patent Office 3,608,286
Patented Sept. 28, 1971

3,608,286
MOWER-CONDITIONER FRAME
Henry N. Lausch and Bruce D. Schwalm, Leola, Pa.,
assignors to Sperry Rand Corporation, New Holland,
Pa.
Continuation-in-part of application Ser. No. 864,062,
Oct. 6, 1969. This application Aug. 17, 1970, Ser.
No. 64,276
Int. Cl. A01d 41/04
U.S. Cl. 56—14.4
8 Claims

ABSTRACT OF THE DISCLOSURE

A frame for a mower-conditioner having a reel, cutting means, a consolidating auger, and conditioning rolls.

In this frame the main lateral structure is a single member passing beneath the machine in a depression formed by a space between the auger housing and the lower conditioning roll.

CROSS REFERENCE TO RELATED APPLICATIONS

This application is a continuation-in-part of copending application Ser. No. 864,062, filed Oct. 6, 1969.

FIELD OF INVENTION

This invention relates generally to agricultural machinery and more particularly to mower-conditioners having means to cut a swath of hay material, to partially consolidate the cut swath, and to condition the partially consolidated swath.

BACKGROUND

In the harvesting of hay it is now common practice to cut a swath of crop material and to convey it rearwardly by a reel while supporting it above the ground to a pair of conditioning rolls which crush and/or crimp the material to facilitate drying. The machines which perform this operation are known as mower-conditioners and may be either self-propelled or pull type.

Two types of pull type mower-conditioners are currently available; one being of a type illustrated in U.S. Pat. 3,517,491 to Lausch et al., issued June 30, 1970, in which conditioning rolls are employed which are of substantially the same width as the cutting means and the reel means. Another form of the pull type mower-conditioner has an auger interposed between the reel and the conditioning rolls to consolidate the material. A commercially available form of the latter type of mower-conditioner has a main frame structure including a transversely extending member which extends above and to the rear of the conditioning rolls, the frame structure supporting a subframe which carries the conditioning rolls, the reel, the auger and the cutting means. This frame construction has several disadvantages, one of them being that too much weight is imposed upon the drawbar of the propelling tractor since the center of gravity of the mower-conditioner is well forward of the transversely extending member. Another disadvantage is that the transversely extending member disposed above and to the rear of the conditioning rolls restricts the placement of windrow shields and swathing baffles and also may cause material to catch upon the supporting framework after it has been conditioned.

The mower-conditioner of the type illustrated in Pat. 3,517,491, has achieved considerable more success than the presently commercially available mower-conditioner mentioned above. One of the reasons that the construction of the patent has been more successful is that its frame does not have the disadvantages of the aforementioned machine. However, it should be noted that the frame construction illustrated in the patent is not applicable to a machine having an auger since it would be disadvanageous to place the transversely extending main frame member behind the conditioning rolls of a machine having an auger, since this would impose too much weight upon the drawbar of the propelling tractor.

SUMMARY OF INVENTION

It is an object of this invention to provide a frame for a mower-conditioner having an auger to consolidate material prior to conditioning which overcomes the disadvantages of the prior art frame constructions.

More specifically, it is an object of this invention to provide a frame for a mower-conditioner having an auger to consolidate material prior to conditioning which will provide for a high ground clearance in transport position, while at the same time providing for a frame-to-header relationship in cutting position which reduces the susceptibility of the header to damage from foreign objects.

Another object of this invention is to provide a frame construction for a mower-conditioner of the type previously referred to in which the frame is positioned well forward in relation to the center of gravity of the machine in order to reduce the amount of weight on the drawbar of the propelling tractor while keeping the tongue or draft frame of the mower-conditioner at a reasonable length.

A further object of the present invention is to provide a frame for a mower-conditioner of the class previously referred to in which the main transverse frame member of the frame is positioned in such a manner that there is no possibility for material to accumulate on the frame, build up, and cause functional problems.

A still further object of this invention is to provide a frame for a mower-conditioner of the class previously referred to in which the main transverse frame member is positioned in such a manner that there are no restrictions on allowable clearance for shape of windrow shields and swathing baffles and no restrictions on the trajectory of the material as it leaves the conditioning rolls which might be imposed by the transverse framing.

It is a further object of this invention to provide a frame construction for a mower-conditioner having a consolidating auger and conditioning rolls which allows for the conditioning rolls to be positioned close to the auger with the upper roll located forward of the lower roll so that it is particularly close to the auger in order to provide the best possible stripping action of the auger and to eliminate the possibility of auger carry-over, to provide for a higher material trajector which, in turn, allows for improved swath and windrow formation.

The foregoing objects and advantages of this invention are accomplished by providing a main frame and a subframe which carries the cutting means, the reel, the auger means, and the conditioning rolls, the subframe being supported upon the main frame by parallel links, the main frame having a transverse frame member which supports the parallel links, the transverse frame member extending underneath the subframe and being disposed closely adjacent the auger and the conditioning rolls in a pocket or cutout immediately adjacent the forward edge of the lower roll and the rear edge of the auger means.

These and other objects and advantages of this invention will be apparent to those skilled in the art after a consideration of the following detailed description, taken in conjunction with the accompanying drawings in which the preferred form of this invention is illustrated.

BRIEF DESCRIPTION OF THE DRAWINGS

FIG. 3 is a view similar to FIG. 1 illustrating the header fully raised to a transport position.

FIG. 5 is an enlarged fragmentary sectional elevation view illustrating in detail the relation of the various components.

FIG. 6 is a reduced scale plan view of the windrow forming portion of the machine taken generally along the line 6—6 in FIG. 5.

FIG. 7 is a view diagrammatically illustrating the header and conditioner assembly.

DESCRIPTION OF A PREFERRED EMBODIMENT

Figure 1:
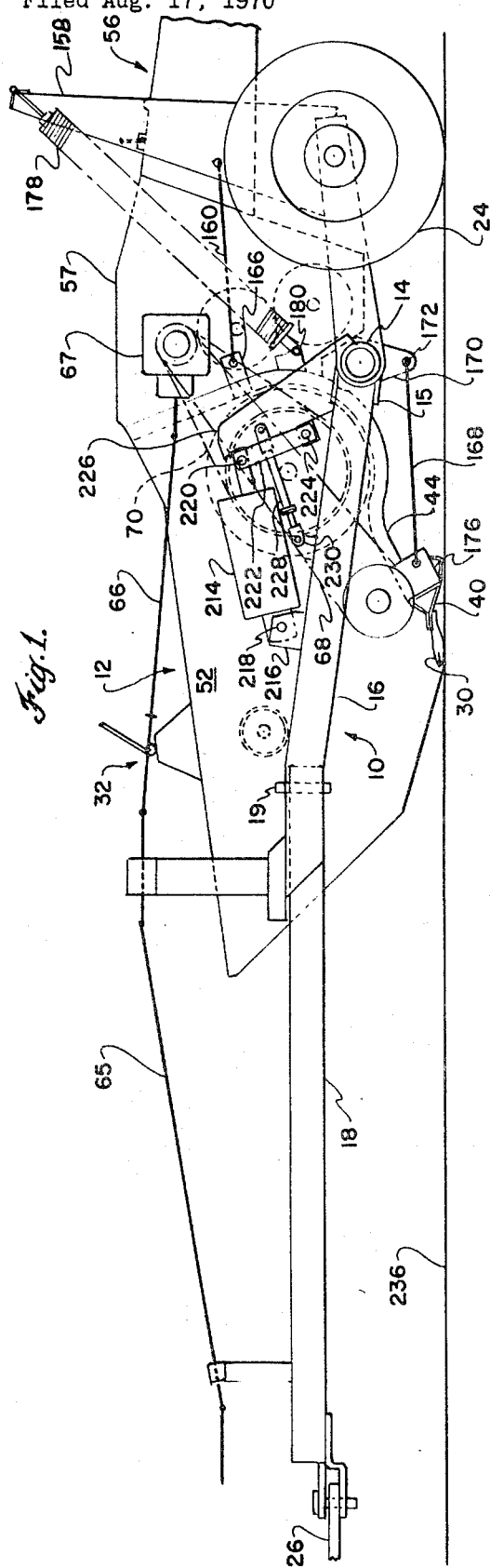
FIG. 1 is a more or less diagrammatic general side elevation view of a mower-conditioner constructed in accordance with the principles of this invention, with the header illustrated in its position for mowing level fields.

In the following description right-hand and left-hand reference is determined by standing to the rear of the mower-conditioner and facing the direction of travel.

Referring to the drawings, the mower-conditioner of this invention includes a main frame indicated generally at 10, and a header or subframe, indicated generally at 12, the header being mounted for vertical shifting movement in a manner more fully set forth below. The main frame includes a rugged tubular cross member or rock shaft 14, which is journalled for rotational movement within a forwardly extending side frame member 16 to which is secured at its forward end a swingable drawbar 18. The side frame member 16 and drawbar 18 comprise the draft frame for the mower-conditioner. The drawbar 18 is pivotally secured to the side frame member 16 by means of a pin 19 and means (not shown) are provided to hold the drawbar in various angular positions of adjustment. As previously mentioned the transversely extending rock shaft is journalled within the side frame member 16 and to this end the frame member 16 is provided with brackets 15, which embrace the rock shaft. A pair of rearwardly extending laterally spaced apart rock arms 20, 20, are rigidly secured to the rock shaft 14. Right and left ground engaging wheels 22, 24 are journalled upon stub axles which extend transversely from the arms 20. The main frame of the mower-conditioner is normally supported on the ground engaging wheels 22, 24 and also on the drawbar 26 of a tractor (not shown) when in the normal operating position.

Supported on the header or subframe 12 and forming a part thereof are crop cutting means 30, a reel 32, auger means 34, and conditioning rolls 36, the reel, and crop cutting means, the auger means, and the conditioning rolls being disposed in tandem or longitudinal array.

The header or subframe 12 also includes transversely extending means including an upper transversely extending structural cross member 38, and a lower forwardly disposed transverse cutterbar frame member 40. These members are interconnected by right and left channel members 42, 44 and transversely extending inclined floor and auger trough means 46, which are centrally apertured at 48 (FIG. 5) to permit the passage of crop material rearwardly from the auger means 34 to the conditioning rolls 36. Extending forwardly from the upper structural cross member 38, the inclined floor and auger trough 46, and the lower transverse cutterbar frame member 40 are spaced apart right and left header side sheets 50, 52. The reel 32 and auger means 34 are journalled for rotation about transversely extending axes parallel to the rock shaft 14 in any suitable manner and are driven by means more fully set forth below. The cutting means 30 is of the reciprocal type and is supported on the lower transverse cutterbar frame member 40 in any conventional manner. It should be noted that while a reciprocating cutter device is illustrated, other forms of cutting devices could be employed.

It should also be noted at this point that in normal operation the crop material to be cut will be raked rearwardly toward the mower or cutting device 30, and then be cut and conveyed rearwardly by the reel 32. The reel has cam actuated elements or fingers 54 that move in such a manner that the material carried rearwardly by the reel 32 can be easily stripped therefrom by the auger means 34 which rotates in a counterclockwise direction when viewed from the left side in the manner illustrated in the drawings.

Figure 4:
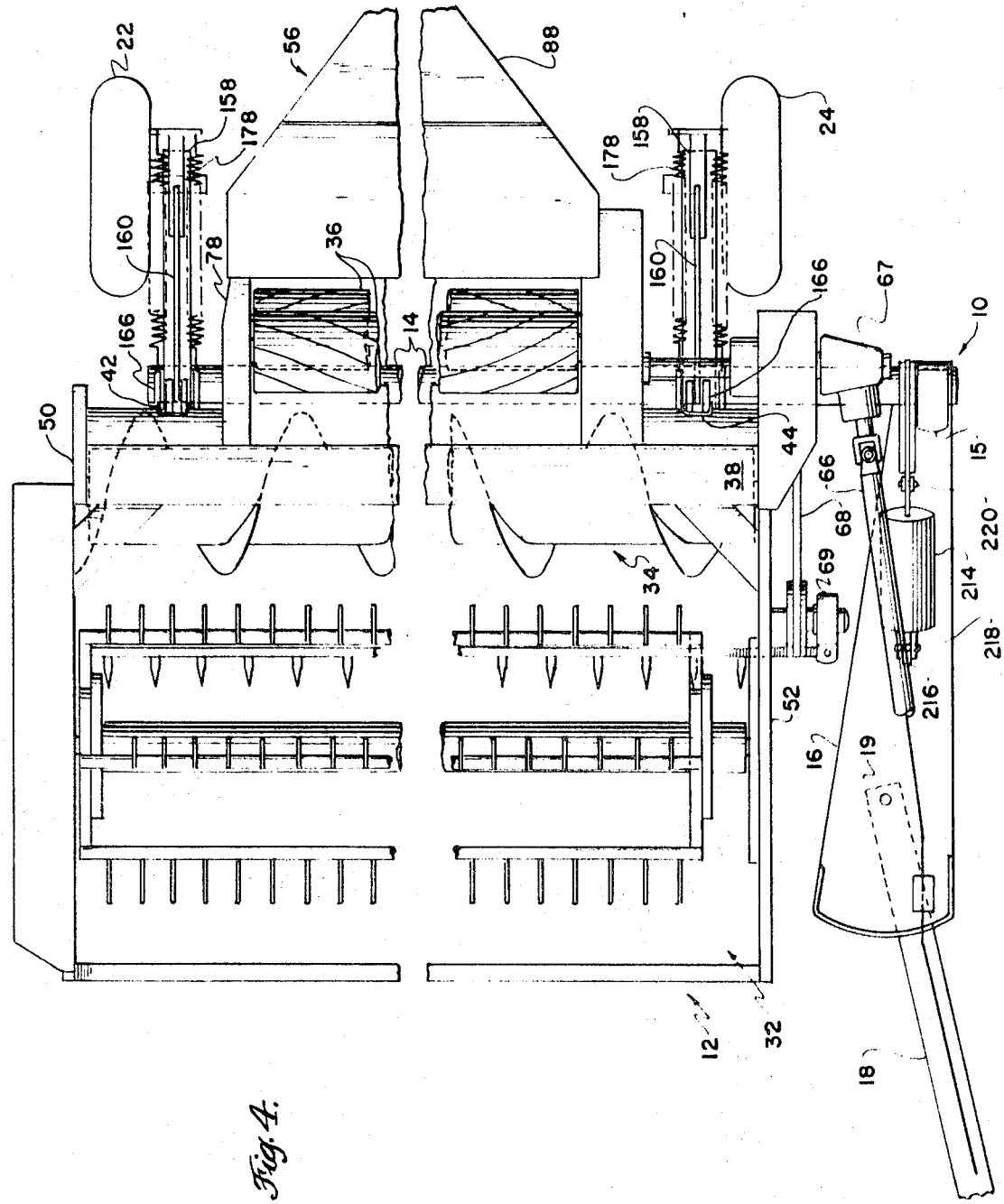
FIG. 4 is a plan view of FIG. 1 with the central portion broken out.

It will be seen from FIG. 4 that the forward portion of the header 12, that is, the portion of the header supporting the auger and reel, is wider than the crop conditioner rolls 36 and that the flights of the auger means 34 are right and left hand so as to direct the cut crop material inwardly towards the opening 48 and the narrower conditioning rolls 36. The rolls discharge the conditioned crop material upwardly and rearwardly into a windrower unit indicated generally at 56.

The crop conditioning rolls 36 are journalled upon spaced apart side sheets 57 which are secured at their forward end to the inclined floor and auger trough member 46. An upper front structural cross member 58 is secured between the upper forward corners of the spaced apart side sheets 57. The member 58, as can best be seen from FIG. 5, is rigidly secured to the upper structural cross member 38 by means of an angle bracket 59, the member 58 being bolted to the bracket 59 by a conventional fastener, such as a nut and bolt 60, the bracket being in turn welded or otherwse secured to the member 38. An upper rear structural member 61 is also secured between the upper rear ends of the members 58. It should be noted at this point that the rolls 36 are journalled to the spaced apart side sheets 57 with the upper roll 36 being disposed slightly forwardly of the lower roll.

The drive system for the cutter 30, reel 32, auger 34 and rolls 36 forms no part of the present invention and therefore it should suffice to say that the drive is from the PTO of the tractor by means of universal shafts 65, 66 to a gearbox 67 and from the gearbox by belt drive 68 to the wobble drive 69 of the sickle mower and also from the gearbox by a sprocket and chain drive 70 to the auger means 34 and from the auger by sprocket and chain drive 71 to the reel 30. Drive of the conditioner rolls 36 is from the gearbox 67 by means of sprocket and chain drives 72, 73, shown in FIG. 5.

The windrower unit 56 is secured to the upper rear structural cross member 61 and spaced apart side sheets 57 and includes a top plate 88 and inwardly directed side sheets 90 having inwardly curled bottom edges 92 as seen in FIGS. 5 and 6. An adjustable pivoted swathing baffle 94, hinged at 96 to the transverse structural member 61 is provided to direct the discharged crop material onto the ground when swathing crop material. Adjustment of the baffle 94 is provided by means of an upright handle 98 pivotally connected at 100 to the baffle and adapted to be releasably fixed in various adjusted positions by means of inserting a pin 102 into a selected hole of a plurality of spaced holes 104 in the handle and into a hole in an associated fixed bracket 106 of the top plate 88 of the windrower unit.

In FIG. 5 the baffle 94 is shown, in full lines, in its adjusted position of trajecting the crop material in a manner to provide a full width swath, that is a swath of a width equal to the width of the conditioning rolls, and in dot and dash lines in its adjusted position which permits the crop material to be deposited in a windrow by the action of the side sheets 90 and bottom edges 92.

The header or subframe 12 is mounted on the main frame 10 by right and left, upper and lower parallel links. To this end it should be noted that the wheel carrying arms 20 are provided with fixed upstanding frame members 158 to which the header is connected by means of upper links 160 which are pivotally secured at their rear ends to the frame members 158 by pivot pins 162 and at their other ends to the right and left channel members 42, 44, by pivot pins 164. (This construction is best illustrated in FIG. 5.) The pivot pins 164 are carried by spaced apart brackets 166, the brackets 166 being welded or otherwise suitably secured to the channel members 42, 44. Lower links 168 extend forwardly from fixed depending arms 170 to which they are pivotally secured by means of pivot pins 172. The forward end of the links 168 are secured by means of pivot pins 174 to fixed brackets 176 carried by the transverse cutterbar frame member 40. The header is counterbalanced by springs 178 which are supported at their upper rear end by the upstanding frame members 158 and are secured at their lower forward ends to bracket means 180 (FIG. 1) which are in turn secured to the right and left channel members 42, 44.

Figure 2:
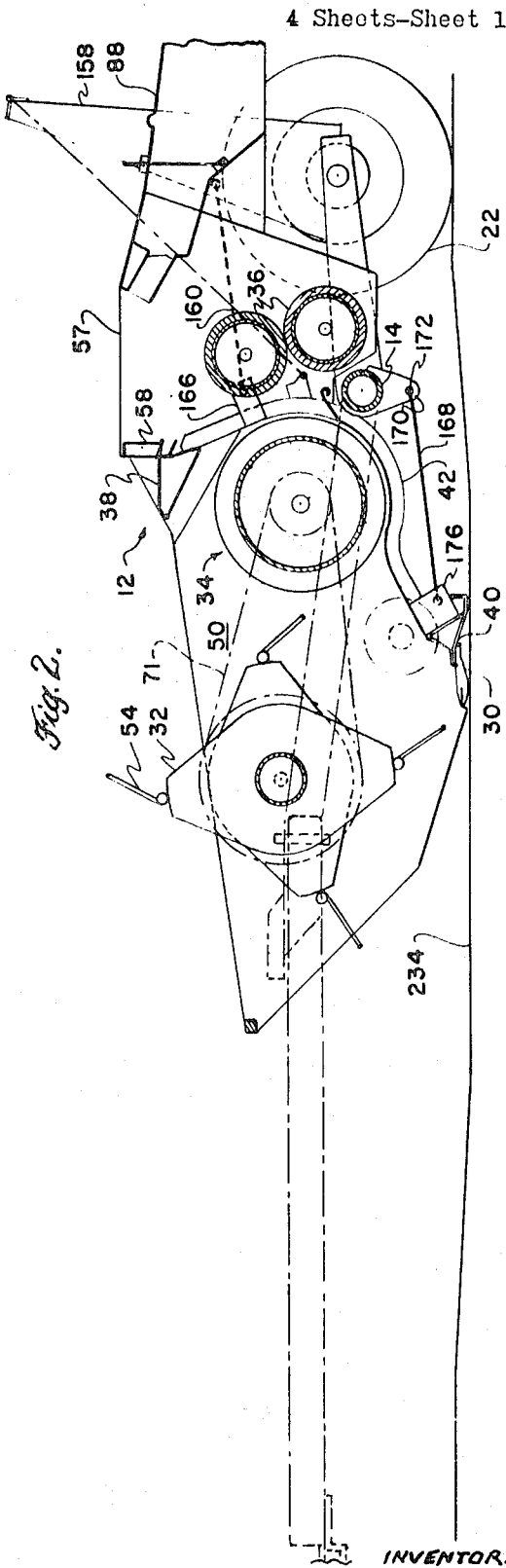
FIG. 2 is similar to FIG. 1 with the header and conditioner parts shown in section and illustrating the header lowered somewhat to a position where mowing in a ground depression.

In the working position, shown in FIGS. 1, 2 and 3, the header is supported on the ground and follows its contour. However, it should be noted that if an obstruction is encountered, the header may swing upwardly and rearwardly due to the counterbalancing of the spring 178 and also due to the almost horizontal position of the links 160, 168 which permit the header to swing upwardly without any forward component of movement.

The header is moved to its mowing attitude (FIGS. 1 and 2) from its transport position (FIG. 3) by means of a piston and cylinder device 214, the cylinder of which is pivotally anchored to a lug 216 on the side frame member 16 by a pin 218, and the piston of which is connected by a pin 220 to a lever 222 pivoted at 224 on an upstanding arm 226 fixedly secured on the rockshaft 14. A telescopic link 228 is connected from a lug 230 of the frame member 16 to the upstanding arm 226, and this link 228 acts as a locking member to selectively lock the header in a raised transport position or service position as shown in FIG. 3 by inserting a removable spacer 232 between the separated flanges of the telescopic links.

In order to raise the header into the transport position shown in FIG. 3 the piston and cylinder assembly 214 is actuated to rotate the rockshaft 14 in a clockwise direction by means of the upstanding arm 226 of the rockshaft 14. The frame member 16 and rockarms 20 then scissors upwardly from the relation shown in FIGS. 1 and 2 to the position shown in FIG. 3 and the upstanding member 158 of the arms 20 swing rearwardly and the depending arms 170 of the rockshaft swing forwardly. Thus the upper links 160 create a pull on the header and the lower links 168 create a push on the header. The combined action of the links 160, and 168 as well of the rearward pull of the spring 178 rock the header upwardly from the lower position shown in FIGS. 1 and 2 to the raised position shown in FIG. 3 which is well above ground level and provides high ground clearance for transport. It is noted that the links 160, 168 maintain their parallel relation in the transport position.

Referring now to FIGS. 5 and 7 it should be observed that a mower depression or pocket 232 is formed in a cutout between the lower portion 233 of the auger housing and the spaced apart side sheets 57, the cutout or pocket being adjacent lower roll 36 of the conditioner. The rockshaft 14 may nest in this pocket. When the equipment is in the normal position of mowing crop material, as for example in a relatively flat field, the cross frame member 14 is situated slightly below the pocket 232 as shown in FIG. 1. In this position the parallel bar suspension of the header provided by the upper and lower lengths positions the header in its proper mowing attitude. Referring now to FIGS. 2 and 5, it will be seen that the header is illustrated in a lower working position to mow in a depression 234 in the ground below the normal ground level 236. In this position the rockshaft 14 has been moved further up into the pocket 232 since the ground supported header has moved downwardly.

By referring to FIGS. 1 and 2 it will be seen that the frame cross member 14 by being located in the pocket 232 formed between the auger housing and conditioner has permitted the frame member to be positioned well forward in relation to the center of gravity of the machine thereby reducing the amount of weight on the tractor drawbar while permitting a reasonably short draft frame 16, 18.

FIGS. 2 and 5 clearly show the close relation of the auger means 34 to the conditioning rolls 36 with the upper roll, because of its being positioned forwardly of the lower roll, being located particularly close to the auger means 34 to provide very effective stripping action of the auger and minimizing the possibility of auger carry over. It is also noted that the cross frame member or rockshaft 14 is located ahead of the lower conditioning roll 36 and that the auger housing 46 is provided with a lip 242 above the rockshaft 14 so that the possibility of crop material accumulating on the frame is eliminated.

Location of the upper conditioning roll 36 forwardly or ahead of the lower conditioning roll provides for high material projection for improved swath and window formation.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

What is claimed is:

1. An improved frame for a harvesting device for cutting and conditioning a relatively wide swath of crop material, said harvesting device including crop cutting means operative to cut a given wide swath of crop material, a reel of substantially the same width as said crop cutting means, said reel having elements for engaging crop material and sweeping a swath of said material rearwardly, auger means disposed behind said reel to receive material directly from said reel, said auger means having a pair of outer augers operable upon rotation of said auger means to consolidate the outer portion of said swath and convey it laterally and rearwardly, and a pair of crop conditioning rolls disposed immediately behind said auger means and operable to engage, condition and project rearwardly the crop material conveyed rearwardly by said auger means, said improved frame comprising:

a main frame having a forwardly extending draft frame, a transversely extending rock shaft journalled within the draft frame for rocking movement about its own axis, and rearwardly extending rock arms means secured to said rock shaft at the forward end thereof and carrying ground engaging wheel means at the rear end thereof;

parallel link means extending forwardly from said main frame;

a subframe supported on the forward ends of said parallel link means for generally vertical shifting movement, said subframe having means supporting said crop cutting means and said reel, said auger means, and said conditioning rolls in close tandem arrangement with the crop cutting means, reel and auger means disposed forwardly of said rock shaft and said conditioning rolls disposed rearwardly of said rock shaft.

2. The improved frame set forth in claim 1 in which said subframe includes transversely extending means supporting said crop cutting means, header side sheets extending forwardly from said transversely extending means and supporting said reel and said auger means, and right and left conditioner side sheets extending rearwardly from said transversely extending means and supporting said conditioning roll.

3. The improved frame set forth in claim 2 in which said right and left conditioner side sheets are secured inwardly of the ends of said transversely extending means.

4. The improved frame set forth in claim 2 in which right and left conditioner side sheets have a cut-out portion in their lower forward edges for the reception of said rockshaft when the subframe is in a lower crop mowing and conditioning position.

5. An improved frame for a harvesting device for cutting and conditioning a relatively wide swath of crop material, said harvesting device including crop cutting means operative to cut a given wide swath of crop material, a reel of substantially the same width as said crop cutting means, said reel having elements for engaging crop material and sweeping said material rearwardly to auger means disposed behind said reel to receive material directly from said reel, said auger means having a pair of outer augers operable upon rotation of said auger means to consolidate the outer portion of said swath and convey it laterally and rearwardly, and a pair of crop conditioning rolls disposed immediately behind said auger means and operable to engage, condition and project rearwardly the crop material conveyed rearwardly by said auger means, said improved frame comprising: a main frame and a subframe supported for generally vertical shifting movement upon said main frame, said subframe supporting said cutting means and reel, said auger means, and said conditioning rolls in transverse longitudinal array, said main frame including a transverse member extending under said subframe forwardly of said conditioning rolls.

6. The improved frame set forth in claim 5 in which said main frame includes a longitudinally extending frame member, said transverse member being journalled for rocking movement within said longitudinally extending frame member.

7. The improved frame set forth in claim 6 characterized by the provision of rearwardly extending rock arm means supported at their forward ends on said transverse member, said rock arms means carrying ground engaging wheel means at their rear end.

8. The improved frame set forth in claim 6 in which said subframe includes transversely extending means normally disposed immediately forwardly of said transverse member, header side sheets extending forwardly from said transversely extending means and supporting said reel and auger means, and conditioner side sheets extending rearwardly from said transversely extending means and supporting said conditioning rolls rearwardly of said transverse member.

References Cited
UNITED STATES PATENTS

| | | | |
|---|---|---|---|
| 3,324,639 | 6/1967 | Halls et al. | 56—14.5 |
| 3,325,981 | 6/1967 | Glass et al. | 56—DIG.1 |
| 3,550,363 | 12/1970 | Halls et al. | 56—DIG.1 |
| 3,555,791 | 1/1971 | McCarty et al. | 56—DIG.1 |

ANTONIO F. GUIDA, Primary Examiner

U.S. Cl. X.R.

56—DIG.1